United States Patent
Kao et al.

(10) Patent No.: US 8,139,054 B2
(45) Date of Patent: Mar. 20, 2012

(54) LUMINANCE COMPENSATION APPARATUS AND METHOD

(75) Inventors: Chang-Jung Kao, Jhonghe (TW); Shu-Wen Teng, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 1360 days.

(21) Appl. No.: 11/322,699

(22) Filed: Dec. 30, 2005

(65) Prior Publication Data

US 2007/0153098 A1    Jul. 5, 2007

(51) Int. Cl.
*G09G 5/00*    (2006.01)

(52) U.S. Cl. .......................... 345/207; 345/89

(58) Field of Classification Search ............ 345/207, 345/604, 87, 88, 89, 690; 348/674, 687
See application file for complete search history.

(56) References Cited

U.S. PATENT DOCUMENTS

| | | | |
|---|---|---|---|
| 6,731,259 B2 | 5/2004 | Yer et al. ........................ 345/89 |
| 7,436,446 B2 | 10/2008 | Shibutani | |
| 7,639,284 B2 | 12/2009 | Kinoshita | |
| 2001/0040632 A1 | 11/2001 | Yang et al. | |
| 2001/0043277 A1* | 11/2001 | Tanaka et al. ............ 348/333.01 |
| 2002/0097441 A1* | 7/2002 | Hara et al. .................... 358/302 |
| 2005/0057546 A1* | 3/2005 | Shibutani ..................... 345/204 |
| 2005/0068332 A1* | 3/2005 | Diefenbaugh et al. ........ 345/604 |
| 2005/0093996 A1* | 5/2005 | Kinoshita ................... 348/226.1 |

FOREIGN PATENT DOCUMENTS

| | | |
|---|---|---|
| DE | 10233175 | 2/2004 |
| DE | 102004007636 | 12/2004 |
| EP | 1365383 | 11/2003 |
| TW | I222338 | 10/2004 |
| TW | I242370 | 10/2005 |
| TW | 200514438 | 4/2006 |
| TW | I253299 | 4/2006 |
| WO | W003090195 | 10/2003 |
| WO | 2005086474 | 9/2005 |

OTHER PUBLICATIONS

Taiwanese language office action dated Mar. 1, 2011.
English language translation of abstract of TW I222338 (published Oct. 11, 2004).
English language translation of abstract of TW I242370 (published Oct. 21, 2005).
English language translation of abstract of TW I253299 (published Apr. 11, 2006).
English language translation of abstract of TW 200514438 (published Apr. 11, 2006).

* cited by examiner

*Primary Examiner* — Chanh Nguyen
*Assistant Examiner* — Jonathan Blancha
(74) *Attorney, Agent, or Firm* — Thomas|Kayden

(57) ABSTRACT

A luminance compensation apparatus and method applied to an electronic apparatus are disclosed. The luminance compensation apparatus includes an environment detector, a processor, and a luminance compensation unit. The environment detector is for detecting environment luminance and outputting a luminance detection value accordingly. The processor is coupled to the environment detector for outputting a compensation parameter according to the luminance detection value. The luminance compensation unit is coupled to the processor for compensating luminance values of pixels of the multimedia data according to the compensation parameter and outputting compensated multimedia data. The method includes detecting environment luminance and obtaining a luminance detection value accordingly; generating a compensation parameter according to the luminance detection value; and compensating luminance values of pixels of the multimedia data and providing compensated multimedia data according to the compensation parameter.

17 Claims, 7 Drawing Sheets

LUMINANCE COMPENSATION APPARATUS AND METHOD

BACKGROUND OF THE INVENTION

1. Field of the Invention

The invention relates in general to a luminance compensation apparatus and method, and more particularly to a luminance compensation apparatus and method, which directly compensates luminance values of pixels of the multimedia data according to the environment luminance.

2. Description of the Related Art

Referring to FIG. 1, a schematic block diagram of a conventional portable device using a gamma correction unit is shown. The portable device 100, such as a mobile phone or a personal digital assistant (PDA), usually uses a tone reproduction unit 110 (e.g. a gamma correction unit) for performing a tone reproduction-curve mapping (e.g. a gamma-curve mapping) on the input multimedia data Dm, such as image or video data and accordingly outputs corrected multimedia data Dc to the LCD 120 for display. Due to the 'surround effect' in a human vision system, the gamma correction unit 110 undercompensates the gamma curve (i.e. end-to-end gamma is about 1.1-1.2) in a dim environment and thus the LCD 120 can provide more subjectively pleasing experience of image/video viewing for a user.

However, the images or videos may be viewed in different environments where lighting conditions are different, and therefore, using the same gamma-curve for correction lacks flexibility and cannot ensure the multimedia data is corrected appropriately. Therefore, it is desirable to have a portable device which can overcome this deficiency.

SUMMARY OF THE INVENTION

It is therefore an object of the invention to provide a luminance compensation apparatus and method. The luminance values of pixels of the multimedia data can be compensated according to the environment luminance information provided by an environment detector.

The invention achieves the above-identified object by providing a luminance compensation apparatus, applied in an electronic apparatus for displaying multimedia data on a display. The luminance compensation apparatus includes an environment detector, a processor, and a luminance compensation unit. The environment detector is for detecting environment luminance and outputting a luminance detection value accordingly. The processor is coupled to the environment detector for outputting a compensation parameter according to the luminance detection value. The luminance compensation unit is coupled to the processor for compensating luminance values of pixels of the multimedia data according to the compensation parameter and outputting compensated multimedia data to the display.

The invention achieves the above-identified object by providing a luminance compensation method applied to an electronic apparatus. The method includes detecting environment luminance and obtaining a luminance detection value accordingly; generating a compensation parameter according to the luminance detection value; and compensating luminance values of pixels of the multimedia data and providing compensated multimedia data according to the compensation parameter.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
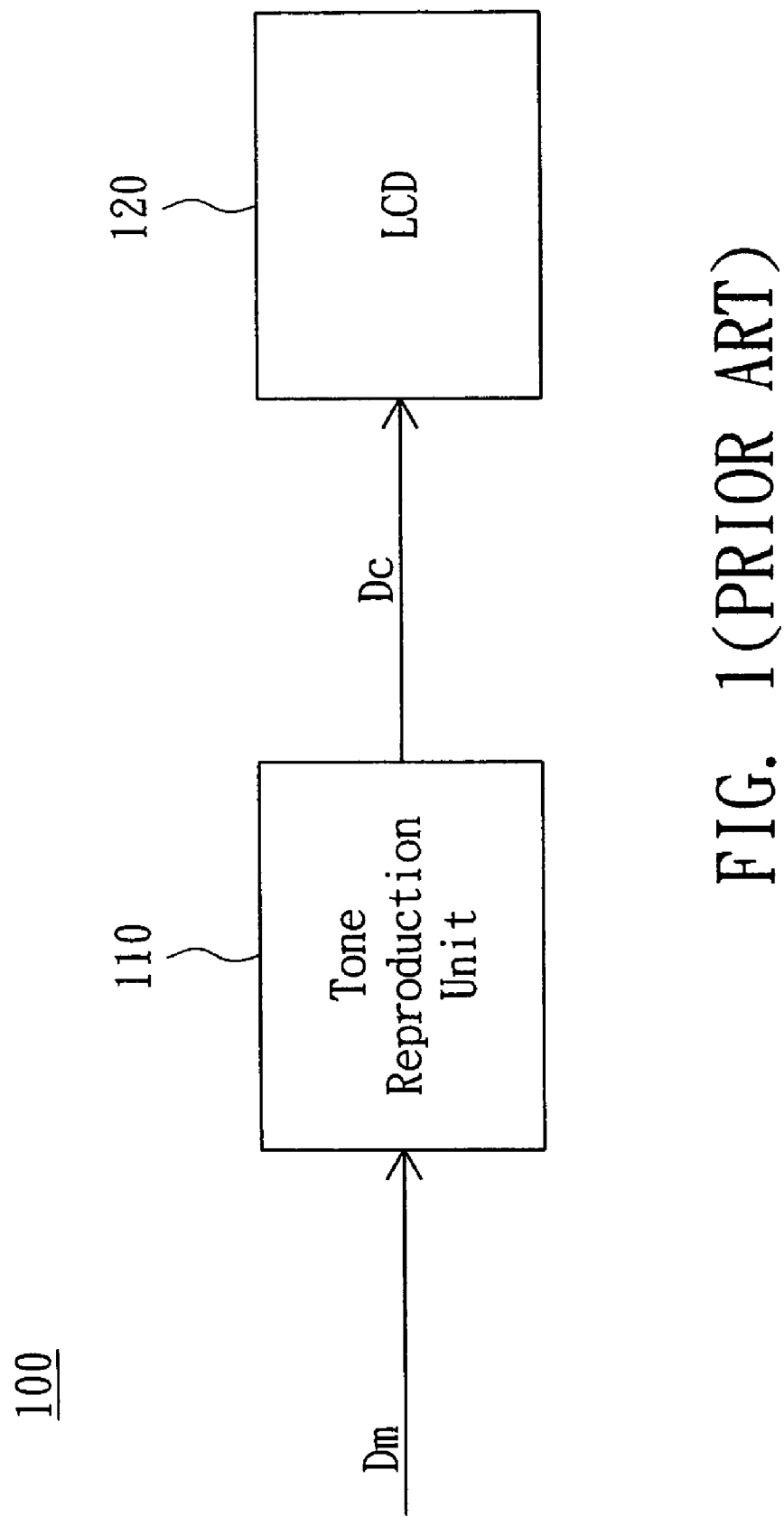
FIG. 1 is a schematic block diagram of a conventional portable device using a gamma correction unit.
Figure 2A:
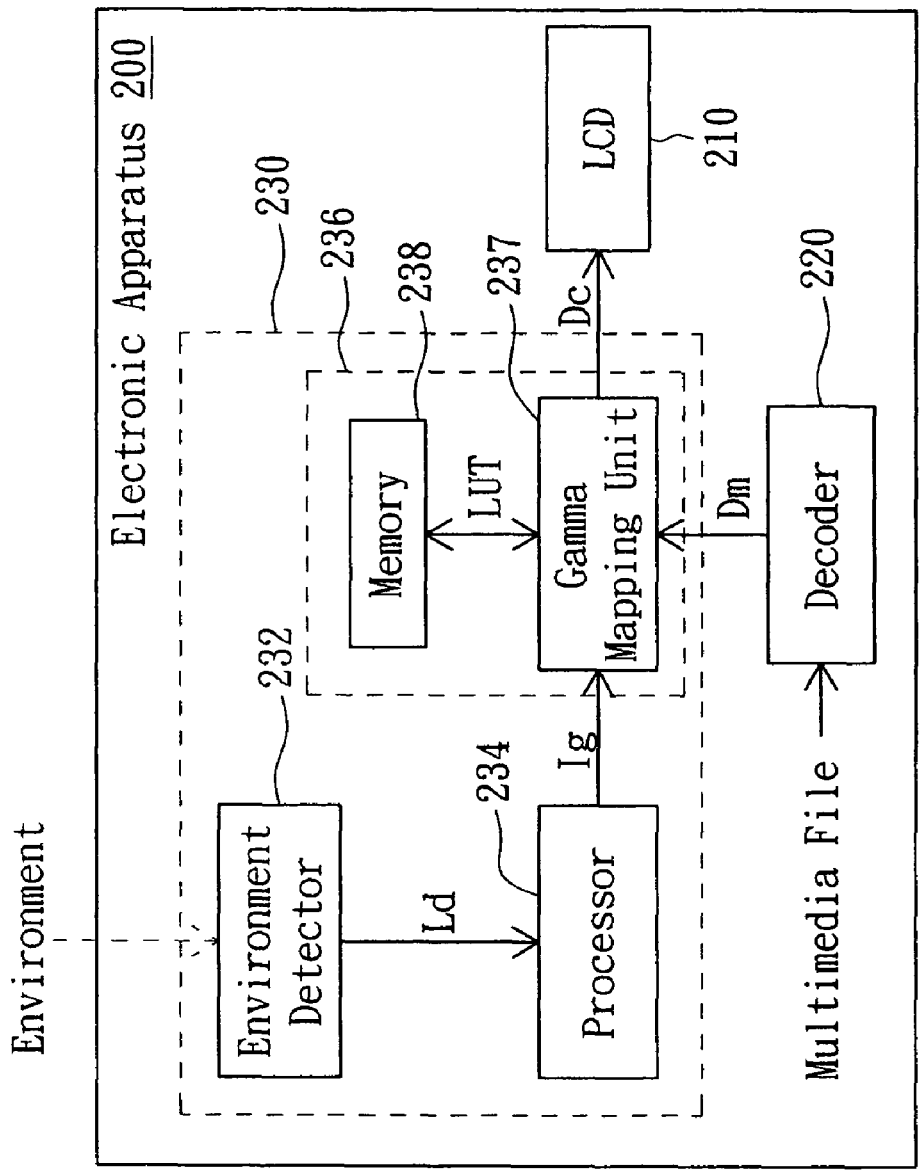
FIG. 2A is a block diagram of the electronic apparatus according to a preferred embodiment of the invention.

Referring to FIG. 2A, a block diagram of an electronic apparatus 200 according to a preferred embodiment of the invention is shown. The electronic apparatus 200, such as a mobile phone or a PDA, includes a LCD 210, a decoder 220, and a luminance compensation apparatus 230. The decoder 220 is used for decoding a multimedia file stored in the electronic apparatus 220 so as to generate decoded multimedia data Dm accordingly. The multimedia file can be an image file or a video file, and therefore, the decoder 220 can accordingly be a JPEG (Joint Photographic Experts Group) decoder or a MPEG (Moving Picture Experts Group) decoder. The luminance compensation apparatus 230 is used for compensating luminance values of pixels of the decoded multimedia data Dm according to environment luminance, and outputting compensated multimedia data Dc to the LCD 210. The LCD displays the images or videos corresponding to the multimedia data Dc for image/video playback purpose. It is noted that the electronic apparatus 200 is not limited to using the LCD 210 as in the embodiment. The electronic apparatus 200 can also use any other display 210 for displaying the multimedia data Dm.

The electronic apparatus 200 further comprises an image sensor (i.e. a camera) and an image signal processing (ISP) unit. The images captured by the image sensor are processed by the ISP unit, and the processed image data is input to a luminance compensation unit for compensating luminance values of pixels of the processed image data according to environment luminance. Then, the compensated image data is output to the LCD 210 for image preview purpose.

The luminance compensation apparatus 230 includes an environment detector 232, a processor 234, and a luminance compensation unit 236. The environment detector 232 is used for detecting the environment luminance and outputting a luminance detection value Ld accordingly. The processor 234, such as a central processing unit (CPU), is coupled to the environment detector 232 for outputting a tone reproduction cure index, e.g. a gamma curve index Ig, according to the luminance detection value Ld. The determination device, the processor 234, may have a mapping table for recording the mapping between luminance detection values and gamma curve indexes. The luminance compensation unit 236 is coupled to the processor 234 for compensating luminance values of pixels of the decoded multimedia data Dm according to the gamma curve index Ig and outputting compensated multimedia data Dc to the LCD 210 for display.

The luminance compensation unit 236 includes tone reproduction mapping unit, e.g. a gamma mapping unit 237, and a memory 238. The memory 238 is used for storing a number of tone reproduction curve lookup tables, e.g. gamma curve lookup tables (LUT), and the gamma mapping unit 237 selects a gamma curve LUT from the memory 238 according to the gamma curve index Ig so as to perform the corresponding gamma mapping operation on the multimedia data Dm.

Although the luminance compensation unit 236 is exemplified to include a gamma mapping unit 237, and the processor 234 is exemplified to output a gamma curve index Ig according to the luminance detection value Ld in the embodiment, the luminance compensation unit 236 can also use other tone reproduction curve (TRC) mapping units or any other pixel-grey-value compensation unit to compensate the multimedia data Dm according to a TRC index or any other compensation parameter. As long as the luminance values of pixels of the multimedia data Dm can be dynamically adjusted according to the environment luminance, it will not depart from the scope of the invention.

Figures 2B, 2C:
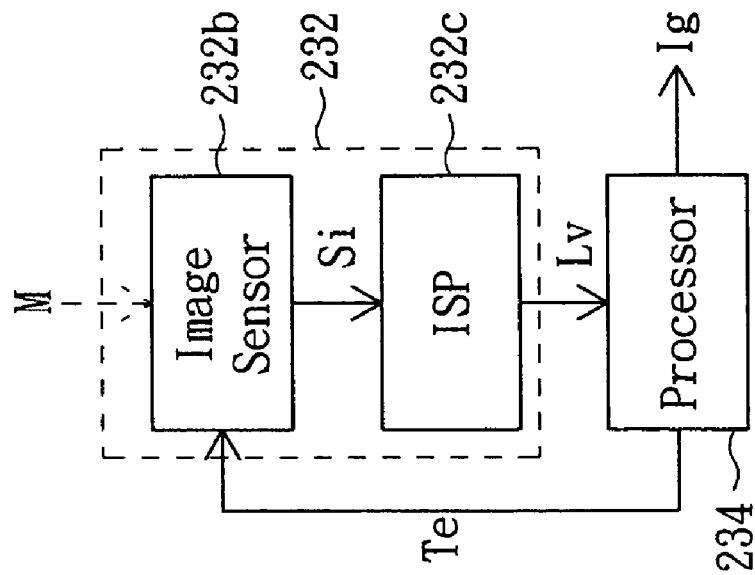
FIG. 2B is a partial block diagram of the luminance compensation apparatus in FIG. 2A using a light sensor to detect the environment luminance.
FIG. 2C is a partial block diagram of the luminance compensation apparatus in FIG. 2A using an image sensor to detect the environment luminance.

Referring to FIG. 2B, a partial block diagram of the luminance ompensation apparatus 230 in FIG. 2A using a light sensor to detect the nvironment luminance is shown. In one example, the environment detector 32 includes a light sensor 232a for detecting the environment light intensity, and accordingly outputting a detected voltage value Vd proportional to the environment luminance. The processor 234 outputs the gamma curve index Ig according to a comparison result of the detected voltage value Vd and a predetermined voltage reference value Vo. In this embodiment, the comparison result of the detected voltage value Vd and the voltage reference value Vo can be regarded as the luminance detection value. Furthermore, the determination device (the processor 234) may have a mapping table for recording the mapping between gamma curve indexes and the comparison results of the detected voltage values and the voltage reference value.

Referring to FIG. 2C, a partial block diagram of the luminance compensation apparatus 230 in FIG. 2A using an image sensor to detect the environment luminance is shown. As mentioned, the electronic apparatus 200 further comprises an image sensor and an image signal processing (ISP) unit. The environment detector 232 may have the image sensor 232b (i.e. a camera) and the image signal processing unit (ISP) 232c for environment detection. The image sensor 232b includes a complementary metal oxide semiconductor (CMOS) sensor or a charge coupled device (CCD) for instance. The image sensor 232b captures images M according to a number of exposure time values Te, and output image signals Si accordingly. The ISP 232c processes the image signals Si, and the outputs image luminance values Lv accordingly. The determination device (the processor) 234 determines a gamma curve index Ig according to the mage luminance values Lv and the exposure time values Te.

Figure 3A:
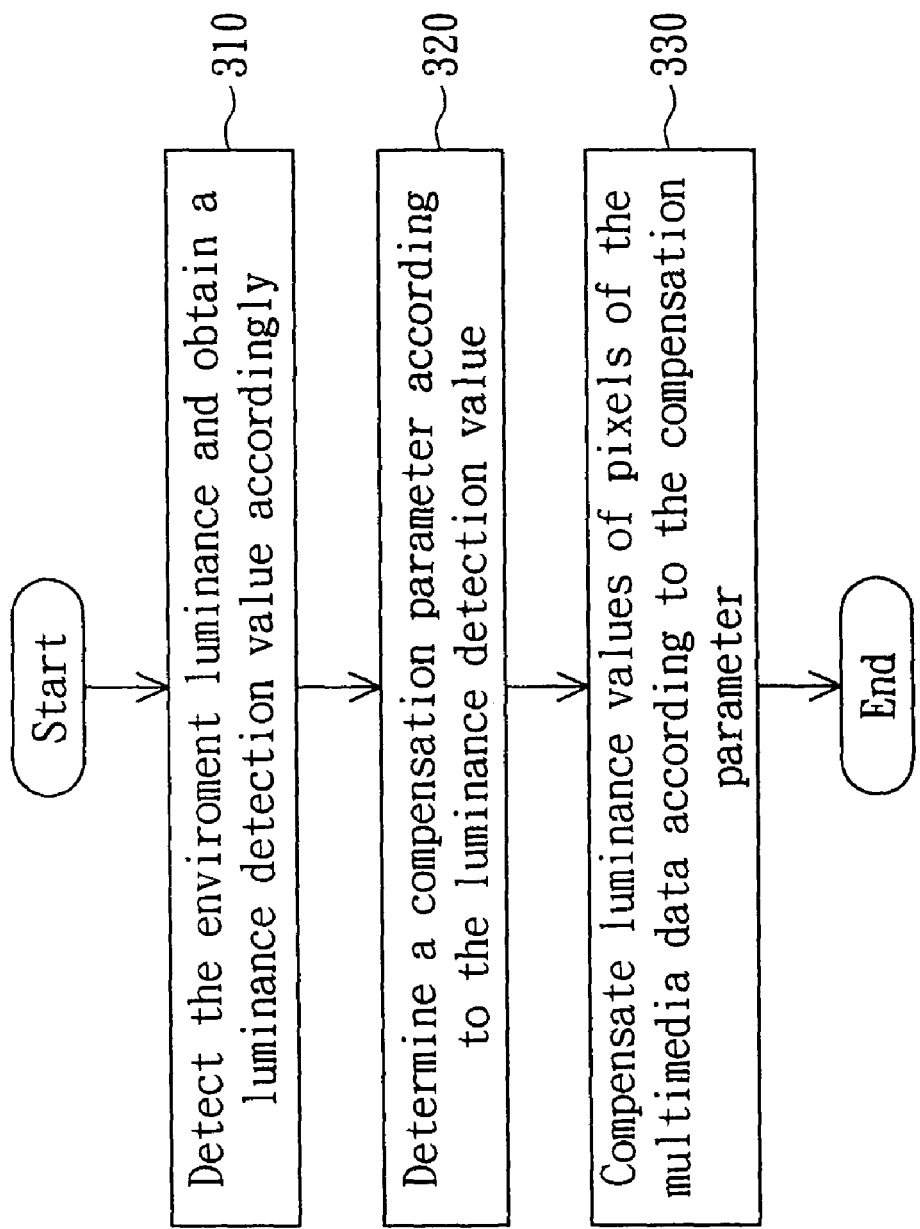
FIG. 3A is a flow chart of the luminance compensation method according to the preferred embodiment of the invention.

Referring to FIG. 3A, a flow chart of the luminance compensation method according to the preferred embodiment of the invention is shown. First, in step 310, the environment luminance of the electronic apparatus 200 is detected and a luminance detection value Ld accordingly is obtained. Next, in step 320, a compensation parameter, such as the gamma curve index Ig, is determined according to the luminance detection value Ld. Finally, in step 330, the luminance values of pixels of the multimedia data Dm are compensated according to the compensation parameter and the compensated multimedia data Dc is provided to the LCD 210 for displaying. In the following description, two examples are taken for illustrating how the luminance compensation method of the invention compensates the luminance values of pixels of the multimedia data Dm according to the environment luminance, wherein the compensation parameter is exemplified to be a gamma curve index Ig.

EXAMPLE ONE

Figure 3B:
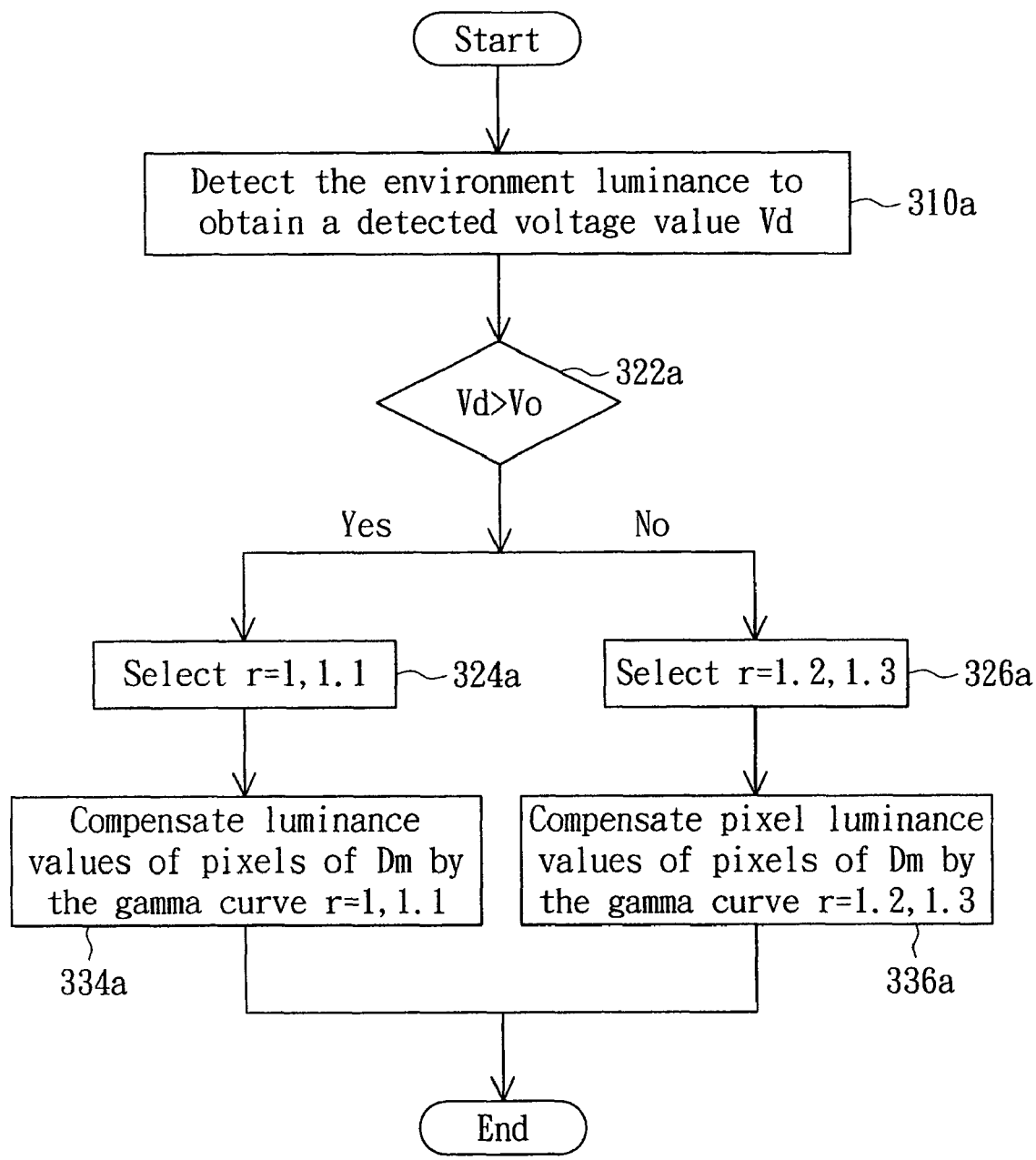
FIG. 3B is a flow chart of the luminance compensation method according to the first example of the invention.

Referring to FIG. 3B, a flow chart of the luminance compensation method according to the first example of the invention is shown. First, in step 310a, by using the light sensor 232a of the environment detector 232 shown in FIG. 2B, detect the environment luminance and obtain a detected voltage value Vd accordingly. The detected voltage value Vd is proportional to the environment luminance. Following that, in step 322a, a determination is made if the detection voltage value Vd is larger than a predetermined voltage reference value Vo. If the value Vd is larger than the value Vo, it means the environment is bright enough, and the method proceeds to step 324a to select a first gamma curve index, such as y=1 or 1.1, for compensation of luminance values of pixels. Finally, in step 334a, the luminance values of pixels of the multimedia data Dm are compensated by using the gamma curve LUT corresponding to the gamma curve index y=1 or 1.1.

If the value Vd is not larger than the value Vo, it means the environment luminance is low, and the method proceeds to the step 326a to select a second gamma curve index, such as y=1.2 or 1.3 for compensation of luminance values of pixels. Finally, in step 336a, the luminance values of pixels of the multimedia data Dm are compensated by using the gamma curve LUT corresponding to the gamma curve index y=1.2 or 1.3. Therefore, the luminance values of pixels of the multimedia data Dm can be dynamically adjusted according to the environment luminance so as to produce more subjectively pleasing experience of image/video viewing for a user.

It should be noted that since the above example has only one voltage reference value Vo, the four gamma curve indexes y=1, 1.1, 1.2, and 1.3 are divided into two groups, where the first group includes indexes of y=1, 1.1 and the second group includes indexes y=1.2, 1.3. When Vd is smaller than Vo, the second group is selected. Otherwise, the first group is selected.

It can be easily understood by the skilled in the art, since there are four gamma curve indexes y=1, 1.1, 1.2, and 1.3, three voltage reference value Vo1, Vo2, Vo3 can be provided for selection of gamma curve index. Wherein Vo1 is smaller than Vo2, while Vo2 is smaller than Vo3. When Vd is smaller than Vo1, the gamma curve indexes y=1.3 is selected. When Vd is greater than Vo1 and smaller than Vo2, the gamma curve indexes y=1.2 is selected. When Vd is greater than Vo2 and smaller than Vo3, the gamma curve indexes y=1.1 is selected. When Vd is greater than Vo3, the gamma curve indexes y=1 is selected.

EXAMPLE TWO

Figure 3C:
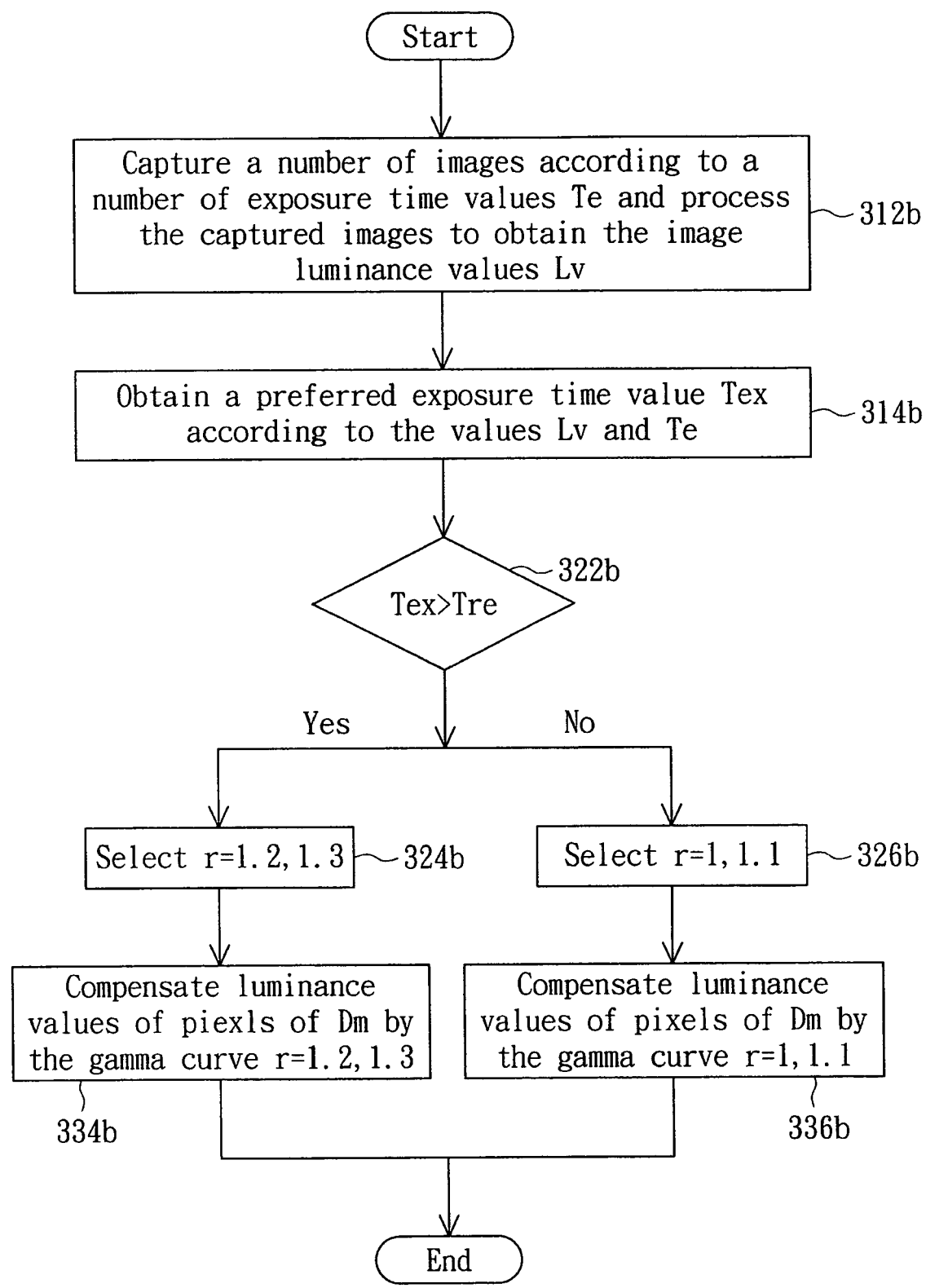
FIG. 3C is a flow chart of the luminance compensation method according to the second example of the invention.

Referring to FIG. 3C, a flow chart of the luminance compensation method according to the second example of the invention is shown. First, in step 312b, capture a number of images M, by using the environment detector 232 shown in FIG. 2C for instance, according to a number of exposure time values Te. Then, process the captured images so as to obtain image luminance values Lv. The image luminance values carry the environment luminance information. Following that, in step 314b, a preferred exposure time value Tex is obtained according to the exposure time values Te and the image luminance values Lv.

Figure 4:
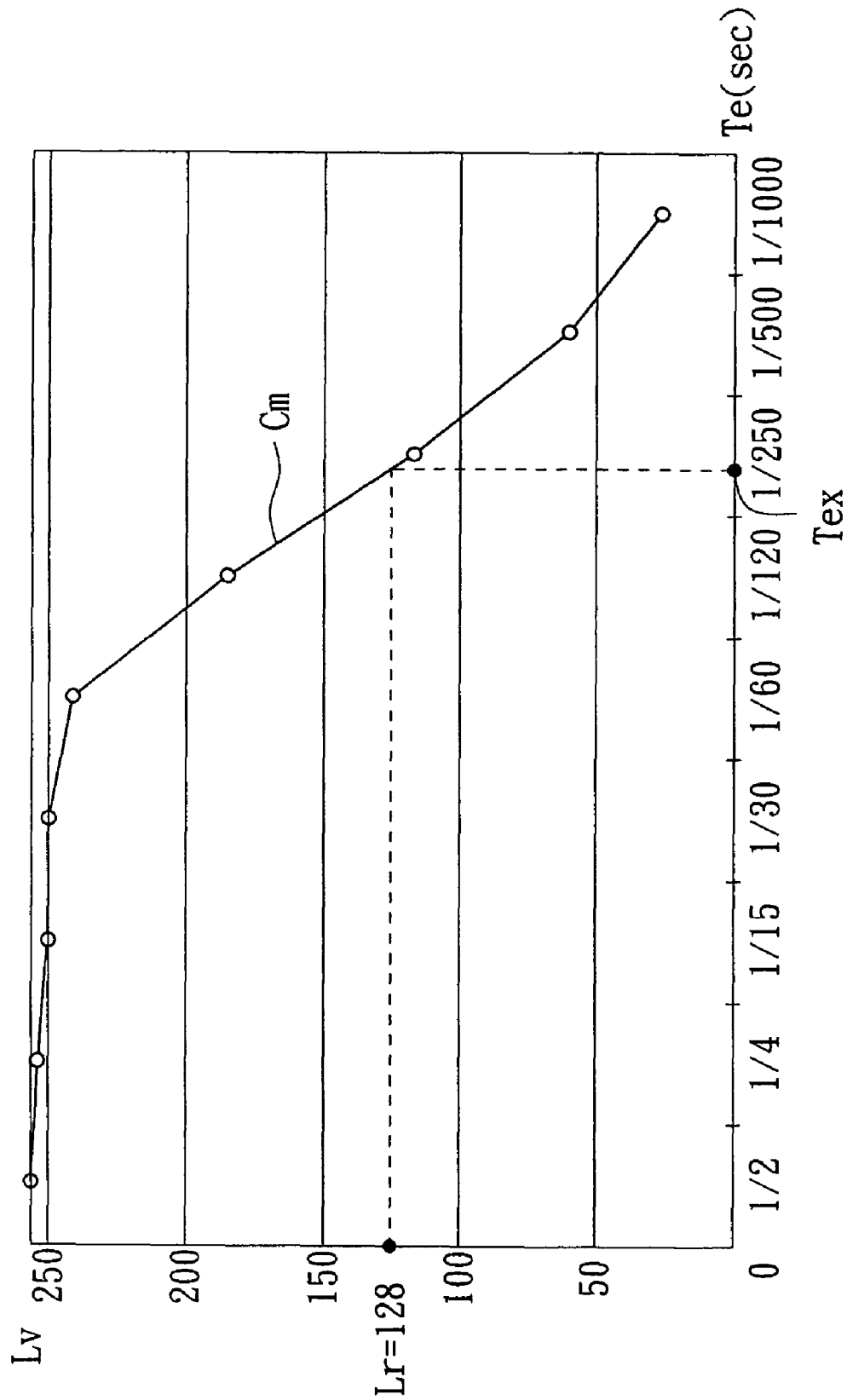
FIG. 4 is a mapping curve of the exposure time values and the measured image luminance values according. to the preferred embodiment of the invention.

Referring to FIG. 4, a mapping curve of the exposure time values Te and the measured image luminance values Lv according to the preferred embodiment of the invention is shown. As shown in FIG. 4, for example, a mapping curve of nine exposure time values Te (between 0 and 1/1000) and the measured image luminance values Lv (0~255) is generated. As mentioned, the processor 234 controls the image sensor 232b to capture nine images M according to nine arbitrary exposure time values Te uniformly distributed between 0 and 1/1000. The exposure time values Te are 1/2, 1/4, 1/15, 1/30, 1/60, 1/120, 1/250, 1/500, and 1/1000 sec. The ISP 124 then processes the captured nine images so as to generate nine image luminance values, which are 250, 247, 245, 245, 240, 190, 120, 60, and 35. Then, the processor 234 generates a mapping curve Cm of the nine exposure time values Te and the nine image luminance values Lv as shown in FIG. 4. Thereafter, the CPU bases on a luminance reference value Lr, e.g. 128, to obtain a preferred exposure time value Tex, e.g. 1/250. In a preferred embodiment, the luminance reference value Lr is determined based on the shape of the mapping curve Cm. In order to decide the luminance reference value Lr, a portion of the mapping curve Cm having relatively dramatic slope is determined, and the luminance reference value Lr is corresponding to a substantially middle point of that portion. In most situations, the luminance reference value Lr will be located between 100 and 150, and in this example, the luminance reference value Lr is 128.

Next, in step 322b, compare the preferred exposure time value Tex with a predetermined exposure time reference value Tre, e.g. 1/100 sec. The predetermined exposure time reference value Tre is determined according to experiments and experiences. If the preferred exposure time value Tex is greater than the predetermined exposure time reference value Tre, it means the electronic apparatus 200 is located in a relatively dark environment, such as an indoor environment, since longer exposure time is required. Then, the method proceeds to step 324b to select a first gamma curve index, such as y=1.2 or 1.3 for compensation of luminance values of pixels. Finally, in step 334b, the luminance values of pixels of the multimedia data Dm are compensated by using the gamma curve LUT corresponding to the gamma curve index y=1.2 or 1.3. If the preferred exposure time value Tex is smaller than the predetermined exposure time reference value Tre, it means the electronic apparatus 200 is located in a relatively bright environment, such as an outdoor environment since shorter exposure time is preferred. Then, the method proceeds to step 326b to select a second gamma curve index, such as y=1 or 1.1 for luminance compensation of pixels. Finally, in step 336b, the luminance values of pixels of the multimedia data Dm are compensated by using the gamma curve LUT corresponding to the gamma curve index y=1 or 1.1. Therefore, the luminance values of pixels of the multimedia data Dm can be dynamically adjusted according to the environment luminance to produce more subjectively pleasing experience of image/video viewing for the user.

It should be noted that since the above example has only one exposure time reference value Tre, the four gamma curve indexes y=1, 1.1, 1.2, and 1.3 are divided into two groups, where the first group includes indexes of y=1, 1.1 and the second group includes indexes y=1.2, 1.3. When Tex is smaller than Tre, the first group is selected. Otherwise, the second group is selected.

It can be easily understood by the skilled in the art, since there are four gamma curve indexes y=1, 1.1, 1.2, and 1.3, three exposure time reference values Tre1, Tre2, Tre3 can be provided for selection of gamma curve index. Wherein Tre1 is smaller than Tre2, while Tre2 is smaller than Tre3. When Tex is smaller than Tre1, the gamma curve indexes y=1 is selected. When Tex is greater than Tre1 and smaller than Tre2, the gamma curve indexes y=1.1 is selected. When Tex is greater than Tre2 and smaller than Tre3, the gamma curve indexes y=1.2 is selected. When Tex is greater than Tre3, the gamma curve indexes y=1.3 is selected.

As mentioned above, the luminance compensation apparatus and method and electronic apparatus using the same of the invention can dynamically adjust the luminance values of pixels of the multimedia data so as to improve quality of image displaying and provide a more subjectively pleasing experience of image/video viewing for the user.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A luminance compensation apparatus, applied in an electronic apparatus for displaying multimedia data on a display, comprising:
   an environment detector detecting environment luminance comprising:
      an image sensor capturing a predetermined number of a plurality of images at different exposure time values; and
      an image signal processing unit, coupled to the image sensor, obtaining a luminance value for each captured image by the image sensor;
   a processor, coupled to the environment detector, controlling the image sensor to capture the images according to the different exposure time values, generating a mapping curve comprising a plurality of plots each representing a relationship between the luminance value of one captured image and the exposure time value corresponding thereto, determining a preferred exposure time value which makes the image sensor capture an image having a luminance reference value in response to the mapping curve, wherein the luminance reference value is determined based on a slope of the mapping curve near a middle point of a portion of the mapping curve, and outputting a compensation parameter according to the determined exposure time value; and
   a luminance compensation unit, coupled to the processor, compensating luminance values of pixels of the multimedia data, which is not related to the captured images, according to the compensation parameter and outputting compensated multimedia data to the display.

2. The luminance compensation apparatus according to claim 1, wherein the processor further determines at least two of the captured images whose luminance values form a range including the luminance reference value, obtains at least two of the exposure time values mapping to the luminance values of the determined images, and obtains the preferred exposure time value between the obtained exposure time values.

3. The luminance compensation apparatus according to claim 2, wherein the image sensor comprises a complementary metal oxide semiconductor sensor or a charge coupled device.

4. The luminance compensation apparatus according to claim 1, wherein the processor determines whether the preferred exposure time value is greater than a exposure time reference value, if so, outputs a first tone reproduction curve index as the compensation parameter, otherwise, outputs a second tone reproduction curve index as the compensation parameter.

5. The luminance compensation apparatus according to claim 1, wherein the compensation parameter is a tone reproduction curve index, and the luminance compensation unit comprises a tone reproduction mapping unit for performing a tone reproduction mapping operation on the multimedia data according to the tone reproduction curve index.

6. The luminance compensation apparatus according to claim 5, wherein the tone reproduction curve index is a gamma curve index, and the tone reproduction mapping unit is a gamma mapping unit for performing a gamma mapping operation on the multimedia data according to the gamma curve index.

7. The luminance compensation apparatus according to claim 6, wherein the luminance compensation unit comprises a memory for storing a plurality of gamma curve lookup tables, and the gamma mapping unit selects a gamma curve lookup table from the memory according to the gamma curve index so as to perform the corresponding gamma mapping operation on the multimedia data.

8. The luminance compensation apparatus according to claim 1, wherein the multimedia data is a video or image data.

9. The luminance compensation apparatus according to claim 1, wherein the electronic apparatus is a mobile phone or a personal digital assistant, and the display is a liquid crystal display.

10. A luminance compensation method, applied to an electronic apparatus for displaying multimedia data, comprising:
   capturing a predetermined number of a plurality of images according to different exposure time values;
   obtaining a plurality of luminance values of the captured images;
   generating a mapping curve comprising a plurality of plots each representing a relationship between the luminance value of one captured image and the exposure time value corresponding thereto;
   determining a preferred exposure time value which makes an image sensor of the electronic apparatus capture an image having a luminance reference value in response to the mapping curve, wherein the luminance reference value is determined based on a slope of the mapping curve near a middle point of a portion of the mapping curve;
   generating a compensation parameter according to the determined exposure time value;
   compensating luminance values of pixels of the multimedia data according to the compensation parameter rather than compensating the captured images; and
   displaying the compensated multimedia data on a display.

11. The luminance compensation method according to claim 10, wherein the determining step comprises:
   determining at least two of the captured images whose luminance values form a range including the luminance reference value;
   obtaining at least two of the exposure time values mapping to the luminance values of the determined images; and
   obtaining the preferred exposure time value between the obtained exposure time values.

12. The luminance compensation method according to claim 10, wherein the determining step comprises:
   determining the preferred exposure time value by mapping the luminance reference value to the mapping curve.

13. The luminance compensation method according to claim 12, wherein the luminance reference value is a value between 100 and 150.

14. The luminance copensation method according to claim 10, wherein the generating step further comprises:
   determining whether the preferred exposure time value is greater than a exposure time reference value;
   if so, selecting a first gamma curve index as the compensation parameter; and
   otherwise, selecting a second gamma curve index as the compensation parameter.

15. The luminance compensation method according to claim 14, wherein the first gamma curve index is 1.2 or 1.3, and the second gamma curve index is 1 or 1.1.

16. The luminance compensation method according to claim 14, wherein the exposure time reference value is $\frac{1}{100}$ sec.

17. The luminance compensation method according to claim 10, wherein the electronic apparatus displays the compensated multimedia data on the display for in a preview mode, or an image/video playback mode.

* * * * *